United States Patent [19]

Klein

[11] 4,452,130
[45] Jun. 5, 1984

[54] ELECTRICAL APPARATUS USEFUL TO PREPARE A HOT BEVERAGE

[76] Inventor: Peter Klein, 19763-44th Ave., Langley, British Columbia, Canada, V3A 3C9

[21] Appl. No.: 415,901

[22] Filed: Sep. 8, 1982

[30] Foreign Application Priority Data

Sep. 30, 1981 [DE] Fed. Rep. of Germany ....... 3138779

[51] Int. Cl.³ ............................................. A47J 31/00
[52] U.S. Cl. ................................................. 99/307
[58] Field of Search ................. 99/281, 282, 292, 295, 99/299, 300, 302 R, 306, 307, 279

[56] References Cited

U.S. PATENT DOCUMENTS 3,371,593 3/1968 Price ................................ 99/307 X
4,356,382 10/1982 Keramati et al. ................ 99/307 X

*Primary Examiner*—Robert W. Jenkins
*Assistant Examiner*—Arthur D. Dahlberg

*Attorney, Agent, or Firm*—Fetherstonhaugh & Co.

[57] ABSTRACT

An electrical apparatus useful to prepare a hot beverage from a flavor substance. The apparatus has a flow-through heater, a container for a liquid and a cup unit for the flavor substance. A pipe joins the cup unit and the liquid container. The cup unit includes a cup and there is a filter carrier to fit in the top of the cup and to carry a filter containing the flavor substance. A passage extends through the filter carrier and is open at both ends of the carrier. A channel is formed between the base of the filter carrier and the passage. Further passages join the interior of the passage to the channel. The filter carrier has upper and lower closures. The heater unit has a container for a liquid; a heater for the liquid and a head to fit over the cup unit. The pipe extends from the heater to the head. The apparatus allows the liquid to pass from the container through the pipe through the head, into the filter and through the upper closure of the cup unit so that liquid may pass through the flavor substance in the filter to form the beverage.

5 Claims, 2 Drawing Figures

ELECTRICAL APPARATUS USEFUL TO PREPARE A HOT BEVERAGE

FIELD OF THE INVENTION

The invention relates to an electrically operated apparatus for the preparation of hot drinks. The apparatus comprises a heating element with a pass through boiler, a liquid container and a tube extending to a cup unit with an upper section in which the substance from which the drink is to be made is located.

DESCRIPTION OF THE PRIOR ART

Such systems are well known in households as coffee machines and are of proven utility. But with known appliances it is not possible to brew beverages in moving vehicles. This is not only because of the lack of the necessary voltage—that problem is soluble without difficulty—but because of the quite different conditions of use. For mobile use, the liquid necessary for brewing has to be carried as well as a drinking cup and the flavour substance, for example coffee or the like. Besides that, in mobile applications the handling has to be simple and safe. Acceleration of the vehicle must not cause spilling of hot liquid, which might be dangerous for the passengers.

SUMMARY OF THE INVENTION

The invention seeks to provide an electrically operated apparatus for the preparation of hot beverages. The apparatus is suitable for use in vehicles. The apparatus can prepare the hot drink in portions rather than in bulk.

Accordingly the invention is in an electrical apparatus useful to prepare a hot beverage from a flavour substance the apparatus including a flow-through heater, a container for a liquid, a cup unit containing the flavour substance in an upper part and a first pipe communicating the cup unit and the liquid container, and is the improvement whereby the cup unit comprises: a cup; a filter carrier adapted to fit in the top of the cup and to carry a filter containing the flavour substance; a main passage extending through the filter carrier and open at both ends of the carrier; a channel defined between the base of the filter carrier and the main passageway; second passageways joining the interior of the cylinder to the channel; an upper closure for the filter carrier; a lower closure for the filter carrier; and the heater unit comprises: a container for a liquid; a heater for the liquid; a head adapted to fit over the cup unit; the first pipe extending from the heater to the head; and means to allow the liquid to pass from the container through the first pipe through the head, into the filter and through the upper closure of the cup unit whereby liquid may pass through the flavour substance in the filter.

Preferably, the means to allow the liquid to pass through the head into the filter includes at least one second pipe projecting from the head and communicating with the first pipe whereby movement of the cup unit against the head allows the second pipe to pierce the upper closure.

BRIEF DESCRIPTION OF THE DRAWINGS

An embodiment of the invention is illustrated in the drawings, in which.

DESCRIPTION OF THE PREFERRED EMBODIMENT

Figure 1:
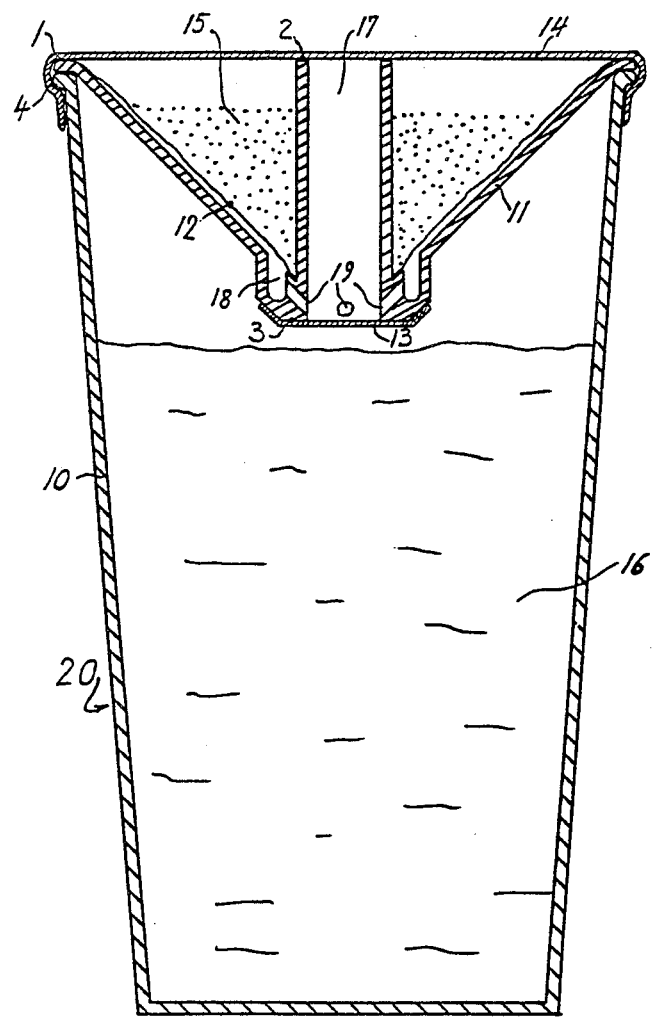
FIG. 1 is a section through a cup unit.

FIG. 1 shows a cup unit 20 having a cup 10, a filter carrier 11, a filter 12, a lower closure 13 and an upper closure 14. This unit 20 carries a flavour substance 15 and water 16.

The filter carrier 12 is equipped with a passageway 17, a collecting channel 18 and drain outlets or second passageways 19. The closures 13 and 14 seal at the areas 1, 2, 3 and 4, so that the water 16 is separated from the flavour substance 15 and from the atmosphere. The flavour substance is also sealed in the carrier 11.

The closures 13 and 14 can be perforated in a suitable manner. Closure 14 can be torn off between the sealing areas 1 and 4 at the edge by means of a closure strip, and one can the remove the filter carrier 11 completely from the cup 10.

Figure 2:
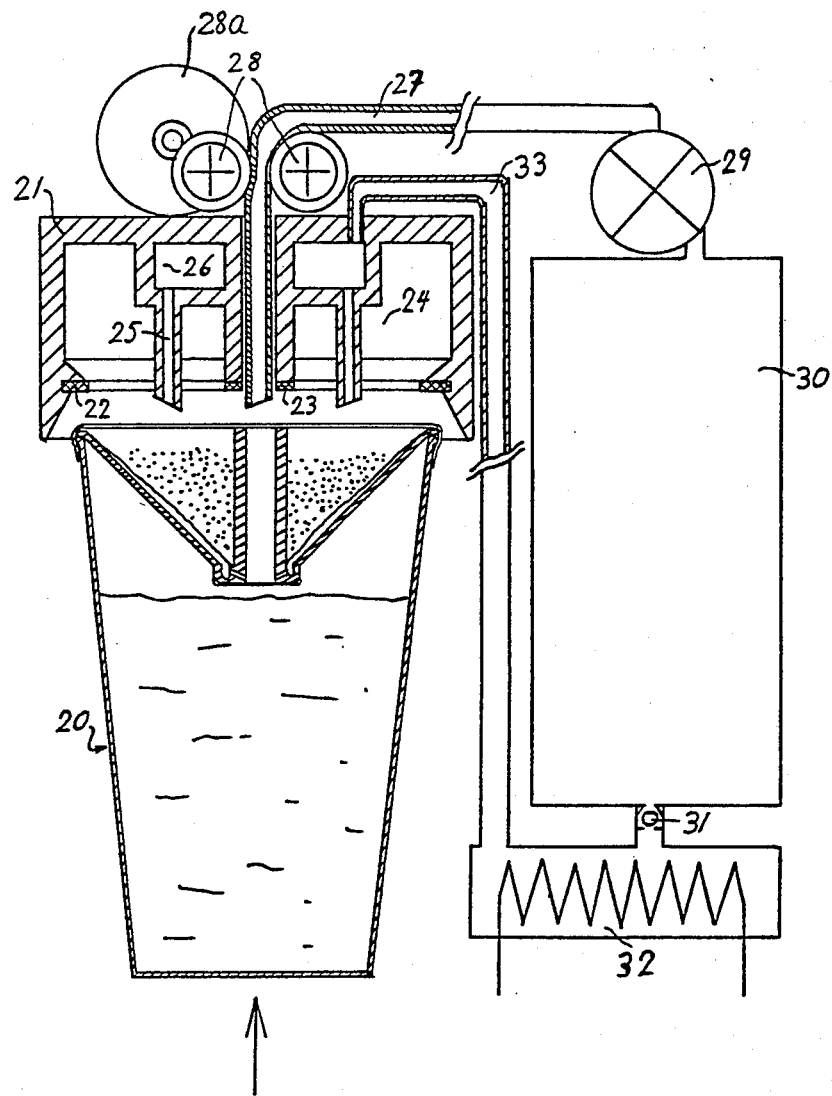
FIG. 2 is a section of a processing unit and cup unit with the cup unit moved out of contact.

FIG. 2 shows the complete apparatus. There is a head 21 equipped with seals 22 and 23 against which the cup unit 20 is positioned. When it is so positioned hot water outlets 25 penetrate closure 14 of the cup unit 20.

A pipe 27 extends from head 21 and is movable by rollers 28, driven by electric motor 28a in a conventional manner, from a rest position as shown in FIG. 2 to the bottom of the cup 10 of cup unit 20, first piercing closures 14 then 13. A pump 29 then transfers the water 16 from cup unit 20 into a container 30. A check valve 31 prevents the hot water, which has been heated in the heater 32, from flowing back into container 30. Pipe 33 connects the heater 32 and a hot water expansion chamber 26 of the head 21.

The procedure for preparing a hot drink is as follows: A cup unit 20 is positioned against the seals 22 and 23. The hot water outlets 25 perforate closure 14 of the cup unit 20. Rollers 28 conduct the tube 27 through main passageway 17 to the bottom of the cup 10, penetrating closure 14 and then closure 13 on the way. Pump 29 transfers the water 16 from the cup 10 into the liquid container 30 and tube 27 is retracted into its rest position again by means of the rollers 28. The water level in the connecting pipe 33, cup 10 and container 30 is the same. The outlet of connecting pipe 33 into the chamber 26 has to be on a higher level than the highest water level in the container 30 to avoid siphoning back of the water into the cup unit 20. In the heater 32 water is heated up to the boiling point. The resulting steam pressure pushes the water in connecting pipe 33 into the expansion chamber 26. Backflow from the heater 32 into the liquid container 30 is avoided by check valve 31. The expansion chamber 26 provides that pulsations of the hot water are damped.

The hot water outlets 25 distribute the water over the flavour substance 15. The contact chamber 24, formed by the head 21 on one side and the surface of the closure 14 on the other side is designed so that its volume is optimum for extracting the flavour out of the flavour substance. This feature is described in West German Auslegerschrift No. 2200-616. The brewed beverage, after being dripped through filter 12, is collected in the collecting channel 18, flows through the passageway 19 and the hole made by the penetration of tube 27 through closure 13, into the cup 10. After brewing is finished, the cup unit 20, with the hot drink in the cup 10, is removed from the head 21. By tearing off the closure strip at closure 14 along the edge between 1 and 4 the cup unit 10 and the filter carrier 11 are separated. The filter carrier 11 is removed completely with filter 12, substance 15 and closures 13 and 14. Instead of the water 16, there is a hot drink, ready for consumption, in the cup 10. The drink can be refined at the consumers choice by additives, for example milk and sugar.

The extremely simple handling should be noted. Besides ripping off a small closure strip, no other manual activities are required. It is also advantageous that during processing the cup unit 20, the head 21, the tube 27, the pump 29, the container 30, the heater 32 and the connecting pipe 33 form a closed loop by means of which spilling of any substance is avoided.

If desired head 21 may be fitted with a switch that operates the switch on the equipment when the cup unit 20 is brought into contact with the head 21.

I claim:

1. In an electrical apparatus useful to prepare a hot beverage from a flavour substance the apparatus including a flow-through heater, a container for a liquid, a cup unit containing the flavour substance in an upper part and a first pipe communicating the cup unit and the liquid container, the improvement whereby the cup unit comprises:

a cup;
a filter carrier adapted to fit in the top of the cup and to carry a filter containing the flavour substance;
a main passage extending through the filter carrier and open at both ends of the carrier;
a channel defined between the base of the filter carrier and the main passageway;
second passageways joining the interior of the main passage to the channel;
an upper closure for the filter carrier;
a lower closure for the filter carrier;

and the heater unit comprises:
a container for a liquid;
a heater for the liquid;
a head adapted to fit over the cup unit;
the first pipe extending from the heater to the head; and
means to allow the liquid to pass from the container through the first pipe through the head, through the upper closure and into the filter of the cup unit whereby liquid may pass through the flavour substance in the filter.

2. Apparatus as claimed in claim 1 in which the means to allow the liquid to pass through the head into the filter includes at least one second pipe projecting from the head and communicating with the first pipe whereby movement of the cup unit against the head allows the second pipe to pierce the upper closure.

3. Apparatus as claimed in claim 1 in which the head includes a contact chamber for the flavour substance.

4. Apparatus as claimed in claim 1 in which the cup unit is adapted to store a liquid beneath the filter carrier;
a reciprocable third tube extending from the liquid container to the head and reciprocable outwardly of the head so that when the cup unit is brought into contact with the head the tube may pass through the first closure and through the second closure into the container; and
a pump to pump the liquid from the cup unit into the container.

5. Apparatus as claimed in claim 1 in which a seal is provided at the head where the head contacts the cup unit.

* * * * *